(12) United States Patent
Ilves et al.

(10) Patent No.: US 6,478,984 B1
(45) Date of Patent: *Nov. 12, 2002

(54) LIQUID FOR EVAPORATIVE COOLING APPARATUS

(75) Inventors: Antti Ilves, Porvoo; Heikki Reijonen, Espoo, both of (FI)

(73) Assignee: Fortum Oyj, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/486,365

(22) PCT Filed: Aug. 26, 1998

(86) PCT No.: PCT/FI98/00664

§ 371 (c)(1), (2), (4) Date: Apr. 24, 2000

(87) PCT Pub. No.: WO99/11730

PCT Pub. Date: Mar. 11, 1999

(30) Foreign Application Priority Data

Aug. 29, 1997 (FI) .................................................. 973551

(51) Int. Cl.$^7$ ................................................. C09K 5/00
(52) U.S. Cl. ........................... 252/71; 252/570; 252/70; 252/73
(58) Field of Search ............................ 252/570, 70, 71, 252/73

(56) References Cited

U.S. PATENT DOCUMENTS 6,165,380 A * 10/2000 Ilves et al. ..................... 252/77
6,294,104 B1 * 9/2001 Ilves et al. ..................... 252/70

FOREIGN PATENT DOCUMENTS

| DE | B1044843 | 11/1958 |
|---|---|---|
| EP | A1-0379175 | 7/1990 |
| FI | 955112 | 4/1997 |
| FI | 99260 | 9/1997 |
| WO | WO9715794 | 5/1997 |
| WO | WO9731988 | 9/1997 |
| WO | A1-9731988 | 9/1997 |

* cited by examiner

Primary Examiner—Yogendra N. Gupta
Assistant Examiner—Derrick G. Hamlin
(74) Attorney, Agent, or Firm—Birch Stewart Kolasch & Birch, LLP.

(57) ABSTRACT

The invention relates to a liquid for evaporative cooling, said liquid being particularly suitable to indirect evaporative cooling apparatus. The liquid comprises an aqueous solution of trimethyl glycine, preferably containing 5–35 wt. % trimethyl glycine or a derivative thereof, and 65–95 wt. % water.

3 Claims, 1 Drawing Sheet

LIQUID FOR EVAPORATIVE COOLING APPARATUS

Figure 1:
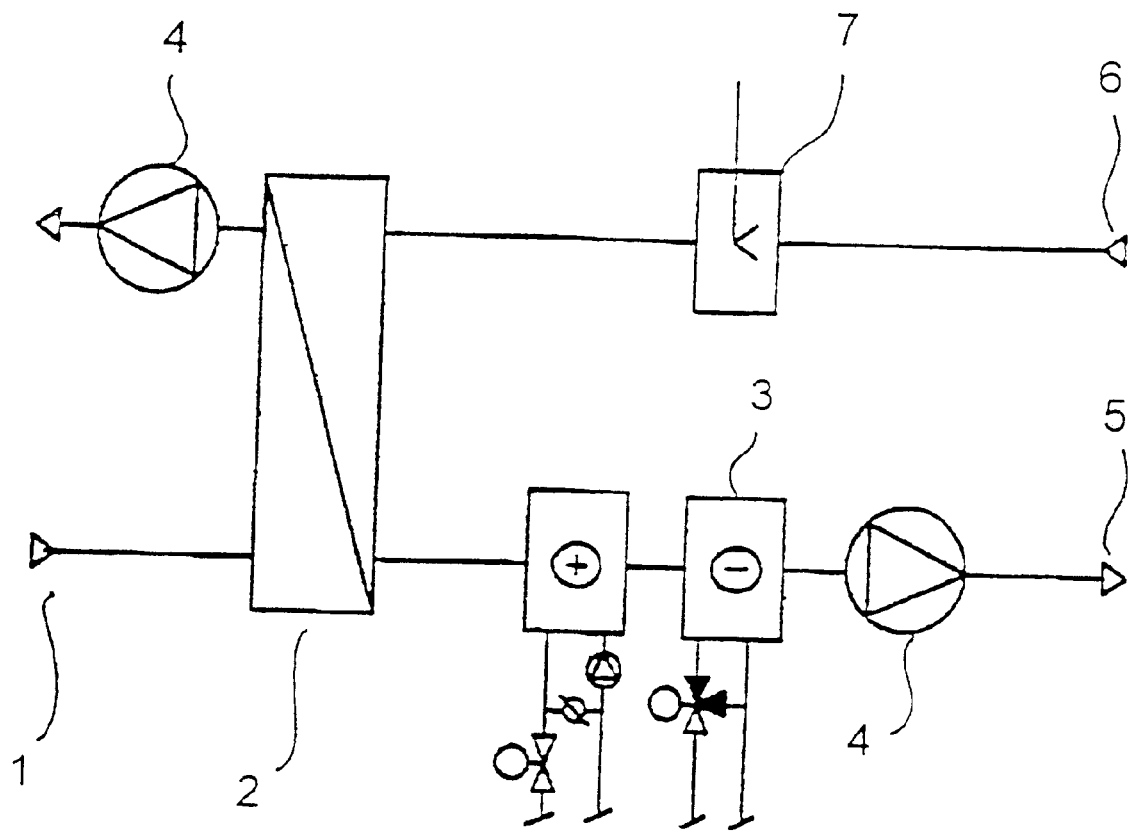

This application is the national phase under 35 U.S.C. § 371 of PCT International Application No. PCT/FI98/00664 which has an International filing date of Aug. 26, 1998, which designated the United States of America.

The present invention relates to a liquid for evaporative cooling, the liquid being especially suitable to indirect evaporative cooling apparatus.

In general, evaporative cooling systems and apparatus use a cooling liquid that is sprayed to the object being cooled. Spray cooling is for instance used in technical building services, particularly in air conditioning equipment. At present, the most common liquid for this purpose is water since it is safe to use and odorless, and further, its heat transfer properties are good. The use of water is, however, limited by the fact that it freezes already at 0° C.

Anti-freezing agents like ethylene and propylene glycols are not preferable since they cause corrosion problems, and since an unpleasant odor is released as they evaporate into the air stream being circulated. In addition, their viscosity is high and they are quite toxic.

Cooling liquids are commonly used in industry, technical building services, refrigerating apparatus, as well as in engine applications. Adequate heat transfer characteristics are an important feature of such cooling liquids. A high specific heat capacity, and sufficient thermal conductivity and pumpability properties thereof are necessary for this. Liquids are characterized by a low viscosity at low temperatures, allowing a turbulent liquid flow to be provided using less pumping power.

In addition to the above properties, preferable cooling liquids are characterized by the fact that they are nonpolluting and nontoxic, particularly in food industry and service water applications. A cooling liquid may in no way be deleterious to the product being processed. Otherwise even minor leaks of the liquid into the process could cause serious accidents. Therefore, the nontoxicity is a decisive factor when choosing the cooling liquid.

With respect to most of the properties water, it is an almost ideal heat transfer liquid. The heat transfer and pumpability properties thereof are good. Further, water is perfectly non-toxic and safe to the environment. as well as completely non-inflammable. The major disadvantage of water is the fact that it may be used in a very narrow temperature range. As is well known, water freezes already at 0° C. and boils at 100° C. Moreover, water is corrosive, especially when in contact with materials containing iron.

Most typical water based cooling liquids are aqueous mixtures of ethylene glycol, propylene glycol, and ethanol. Ethylene glycol is one of the most common cooling liquids and it is especially used in various automobile industry applications. Disadvantages of ethylene glycol are, however, its toxicity and its polluting character. Accordingly, propylene glycol is often used instead of ethylene glycol in applications where nontoxicity is required. Even though propylene glycol is relatively nontoxic, it is, however, also environmentally questionnable. Another drawback of propylene glycol is that its viscosity increases significantly at low temperatures, making a higher pumping power necessary.

Compared to ethylene glycol, the lower toxicity of ethanol makes it a preferable cooling liquid. However, the use of ethanol is limited by the high volatility thereof, and as a consequence the liability thereof to catch fire. as well as the great viscosity increase at low temperatures, this viscosity increase being, however, less significant than with propylene glycols. For this reason, ethanol is widely used as a coolant in laboratories and in applications where nontoxicity is demanded. A problem eventually associated to the use of ethanol is the required approval by the health authorities, thus making its use as a cooling agent more difficult.

An object of the present invention is to provide a liquid for evaporative cooling. this liquid being particularly applicable to indirect evaporative cooling systems and apparatus, and by means of which it is possible to solve the problems associated with the state of the art and to eliminate the disadvantages thereof.

Further, an object of the invention is to provide a evaporative cooling liquid useful at low temperatures, the use thereof being environmentally safe, economical, and without any risk to the health.

The evaporative cooling liquid is characterized in the appended claims.

Among the essential properties of a liquid used for evaporative cooling are a small droplet size and a low temperature thereof. Small droplets increase the heat transfer surface area between the liquid and the gas surrounding it, whereas a great temperature difference increases the heating/cooling efficiency.

According to the present invention the preferable compound useful as a component of the evaporative cooling liquid is trimethyl glycine or the salts of trimethyl glycine hydrate. Trimethyl glycine, or betaine, is particularly preferable. Betaine may for instance be prepared by extracting from natural products such as from sugar beets. or by a biochemical process thus allowing the production of a biological evaporative cooling liquid with a favorable life cycle.

The liquid used in the evaporative cooling systems of the invention, which are preferably indirect, comprises 5–35% (weight by weight) trimethyl glycine or a derivative thereof, and 65–95 wt-% water.

The advantages of this evaporative cooling liquid are the nontoxicity, safety, and the lack of odor. It has the same physical properties as glycol solutions, and it is applicable at temperatures between −20 and +100° C. It is preferably used at temperatures ranging from −15 to +80° C. Trimethyl glycine, or betaine, decreases the size of the water droplet, propably because of the effect of the hydrophobic methyl end, as well as the hydrophilic acid end of the trimethyl glycine molecule. This allows the use of the liquid at temperatures below 0° C.

If necessary or desired, the evaporative cooling liquid of the invention may be combined with conventional corrosion inhibitors, stabilizing and marker agents, and other additives well known in the art.

The evaporative cooling liquid of the invention is less toxic and less polluting that the cooling liquids already known in the art. The liquid is not classified as a hazardous waste, and it may easily be disposed of, thus lowering the costs. The waste liquid may be handled without any special measures, and it may be absorbed into the earth or drained into the sewer, whereas ethylene and propylene glycols, as well as ethanol used in the state of the art must be disposed of in a special way as hazardous wastes. or under the supervision of the authorities in charge.

The evaporative cooling liquid of the invention is useful in various evaporative cooling applications, particularly at low temperatures and in situations where the liquid must be environmentally friendly and nontoxic.

The evaluation of the toxicity of the compounds is based on the $LD_{50}$ values from the literature. The $LD_{50}$ values used are tested orally with rats. The results are shown below in table I

TABLE I

| Compound | LD$_{50}$/mg/kg |
|---|---|
| Ethylene glycol | 4700 |
| Propylene glycol | 20000 |
| Ethanol | 7060 |
| Trimethyl glycine | 11179 |

In Table II the kinematic viscosities of the liquids are compared at the concentration corresponding to the freezing point of −15° C. The freezing point is defined as the temperature at which first crystals appear in the solution.

TABLE II

| Liquid | Concentration % by weight | Kinematic viscosity, mm$^2$/s | | | |
|---|---|---|---|---|---|
| Temperature | | 20° C. | 0° C. | −10° C. | −15° C. |
| Ethylene glycol | 30.5 | 2.1 | 4.3 | 6.5 | 8.2 |
| Propylene glycol | 33 | 3.3 | 7.8 | 14.4 | 20 |
| Ethanol | 24.5 | 2.5 | 5.9 | 10.9 | 15.8 |
| Trimethyl glycine | 35 | 2.1 | 5.1 | 11 | 17.2 |

Table III below shows the effect of trimethyl glycine on the freezing point of aqueous trimethyl glycine solutions.

TABLE III

| Concentration of trimethyl glycine | Freezing point, ° C. |
|---|---|
| 5 | −0.9 |
| 10 | −2.1 |
| 20 | −5.1 |
| 25 | −7.2 |
| 30 | −10.7 |

The surface tensions of typical heat transfer liquids are presented below in Table IV. The surface tension of trimethyl glycine is comparable to that of water. and higher than with glycols.

TABLE IV

| Solution | Surface tension, mN/m |
|---|---|
| Water | 72 |
| Ethylene glycol (50 wt-%) | 55 |
| Propylene glycol (50 wt-%) | 45 |
| Trimethyl glycine solution (35 wt-%) | 72 |
| Trimethyl glycine solution (50 wt-%) | 76 |

Table V shows the vapor pressures of several heat transfer liquids at 37.8° C. Since the vapor pressure of the trimethyl glycine solution is lower than with other solutions, it is not evaporated/volatilized so easily by an air stream.

TABLE V

| Solution | Vapor pressure, Pa (at 37.8° C.) |
|---|---|
| Water | 6.1 |
| Ethylene glycol (50 wt-%) | 5.5 |
| Propylene glycol (50 wt-%) | 5.2 |
| Trimethyl glycine solution (35 wt-%) | 5.4 |
| Trimethyl glycine solution (50 wt-%) | 4.1 |

The solution of the invention containing 5–35 wt-% trimethyl glycine, or a derivative thereof, and 65–95 wt-% water, may be used in evaporative cooling systems, particularly in an indirect evaporative cooling apparatus.

FIG. 1 presents a typical evaporative cooling apparatus where an indirect humidity cooling is combined with a mechanical refrigeration. Fresh air enters at 1 and is fed to a heat recovery means 2 that cools down the fresh air and refrigerates the exhaust air. The reference numeral 3 illustrates the mechanical refrigeration, 4 illustrates mechanical ventilation pumps, and 5 refers to the incoming air. The reference numeral 6 stands for the exhaust air that is fed to the evaporative cooling apparatus 7, and then to the heat recovery means 2. Thereafter the refrigerated exhaust air is ejected from the system through the mechanical ventilation pump 4. Indirect humidity cooling is combined with mechanical refrigeration to reduce the need for the latter. The idea of the indirect humidity cooling is to humidify the exhaust air, thus lowering the temperature thereof. The temperature of the fresh air is lowered with the aid of the cooled exhaust air in the heat recovery means. If necessary, the incoming air is further warmed up mechanically. The mechanical refrigeration alone consumes about 3–4 times more energy than the combination of the indirect cooling and mechanical refrigeration.

Trimethyl glycine is a nontoxic and odorless, naturally occuring raw material. It lowers the freezing point of water, it has excellent heat transfer properties. unpleasant odors are not released from it, and it may be used without any corrosion inhibitors to prevent corrosion since it is as such only weakly corrosive. An important advantage of using trimethyl glycine solution in spray cooling apparatus is the low temperature of water which increases the cooling efficiency. Accordingly. the system may be used for cooling air at temperatures near 0° C., for instance in refrigerated storehouses where the temperature of the air thus drops to a value below 0° C. Further, the fact that trimethyl glycine is odorless and forms droplets easily due to its high surface tension makes the use thereof very attractive.

The invention is described above with reference to some preferable embodiments thereof, the details of which should not, however, be considered as narrowly limiting the invention. On the contrary, many modifications and variations are possible within the scope and spirit of the invention defined in the appended claims.

What is claimed is:

1. A method of cooling air in an evaporative cooling system comprising contacting air to be cooled with a liquid comprising an aqueous trimethyl glycine solution.

2. The method according to claim 1, wherein the liquid contains 5–35 wt-% trimethyl glycine or a derivative thereof, and 65–95 wt-% water.

3. The method according to claim 1, wherein said liquid is directly sprayed into the air being cooled and/or onto a heat transfer surface cooling the air.

* * * * *